A. GODFREY.
BLOWPIPE APPARATUS FOR CUTTING METAL.
APPLICATION FILED JAN. 26, 1921.

1,431,650.

Patented Oct. 10, 1922.
12 SHEETS—SHEET 1.

Fig.1.

Inventor
Alfred Godfrey
by Hubert A. Gill
Attorney

A. GODFREY.
BLOWPIPE APPARATUS FOR CUTTING METAL.
APPLICATION FILED JAN. 26, 1921.

1,431,650.

Patented Oct. 10, 1922.

Inventor
Alfred Godfrey
by Hubert A. Gill
Attorney

A. GODFREY.
BLOWPIPE APPARATUS FOR CUTTING METAL.
APPLICATION FILED JAN. 26, 1921.

1,431,650.

Patented Oct. 10, 1922.
12 SHEETS—SHEET 6.

Inventor
Alfred Godfrey
by
Hubert A. Gill.
Attorney

A. GODFREY.
BLOWPIPE APPARATUS FOR CUTTING METAL.
APPLICATION FILED JAN. 26, 1921.

1,431,650. Patented Oct. 10, 1922.
12 SHEETS—SHEET 8.

A. GODFREY.
BLOWPIPE APPARATUS FOR CUTTING METAL.
APPLICATION FILED JAN. 26, 1921.

1,431,650.

Patented Oct. 10, 1922.
12 SHEETS—SHEET 9.

Inventor
Alfred Godfrey
by Hubert A. Gill
Attorney

A. GODFREY.
BLOWPIPE APPARATUS FOR CUTTING METAL.
APPLICATION FILED JAN. 26, 1921.

1,431,650.

Patented Oct. 10, 1922.
12 SHEETS—SHEET 10.

Inventor
Alfred Godfrey.
by
Hubert A. Gill
Attorney

Patented Oct. 10, 1922.

1,431,650

UNITED STATES PATENT OFFICE.

ALFRED GODFREY, OF LONDON, ENGLAND.

BLOWPIPE APPARATUS FOR CUTTING METAL.

Application filed January 26, 1921. Serial No. 440,136.

*To all whom it may concern:*

Be it known that I, ALFRED GODFREY, a subject of the King of Great Britain, and residing at Boundary Road, Wood Green, London, England, have invented certain new and useful Improvements in Blowpipe Apparatus for Cutting Metal, of which the following is a specification.

This invention relates to apparatus for cutting metals by the oxy-acetylene process or the like. It is the object of the invention to provide means in such apparatus for mechanically feeding the burner nozzle over the work or vice versa at speeds which may be varied at will according to the size of the work to be cut and to the thickness and nature of the metal to be cut, whereby a more even finish is given to the work-piece cut out. Another object is to simplify the transmission of the drive from the speed changing mechanism to the burner nozzle or other part which is moved during the cutting, so that such transmission may be effected in all positions of the parts of the mechanism without any complicated splined shaft and sliding gear connections, such as are necessary if the drive is transmitted along the paths of movement of members sliding one upon another and so forth. A further object of the invention is to provide means whereby after a predetermined amount of travel the movement of the cutter head is automatically stopped. A still further object of the invention consists in providing means for feeding the burner nozzle over the work or vice versa when it is desired to cut out work-pieces of special shapes or circles or segments of circles of relatively large dimensions.

According to the present invention variable speed gearing is provided giving a wide range of speeds of driving, while the said gearing is connected to the various feed shafts by flexible transmission means, the amount of feed of the cutter head being determined by adjustable stop devices actuated by the movement of the cutter head and adapted to disengage the drive between the flexible shafts and the feed spindles. These and other features of the invention will now be described with reference to the accompanying drawings, wherein:—

Figure 1ª is a partial detail view showing a modification.

Figure 1:
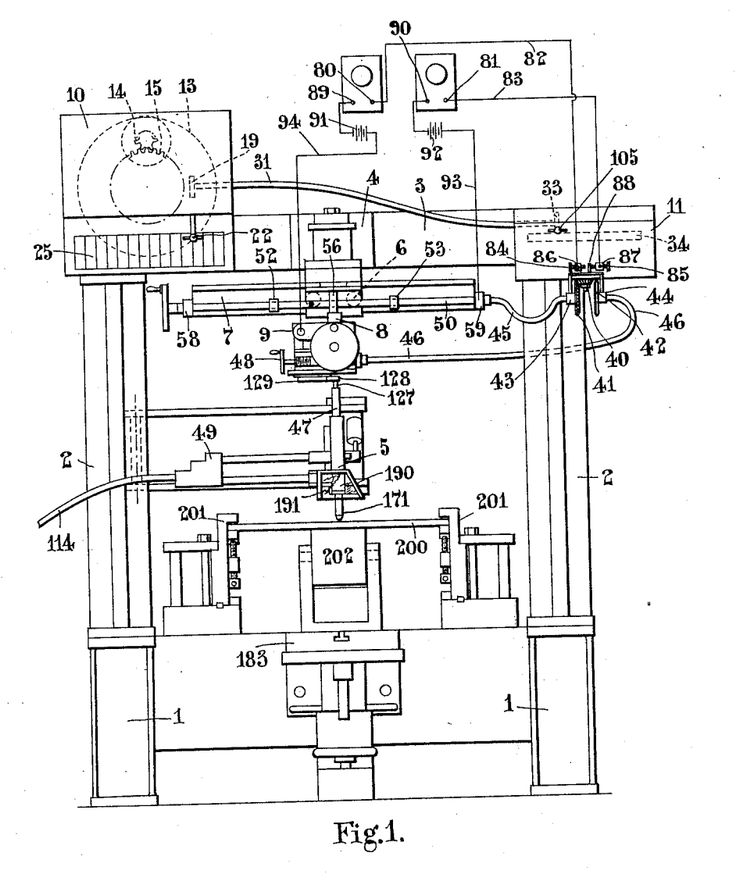
Figure 1 is a view in elevation of one form of construction of a machine according to the present invention and shows the use of friction driving mechanism.
Figure 2:
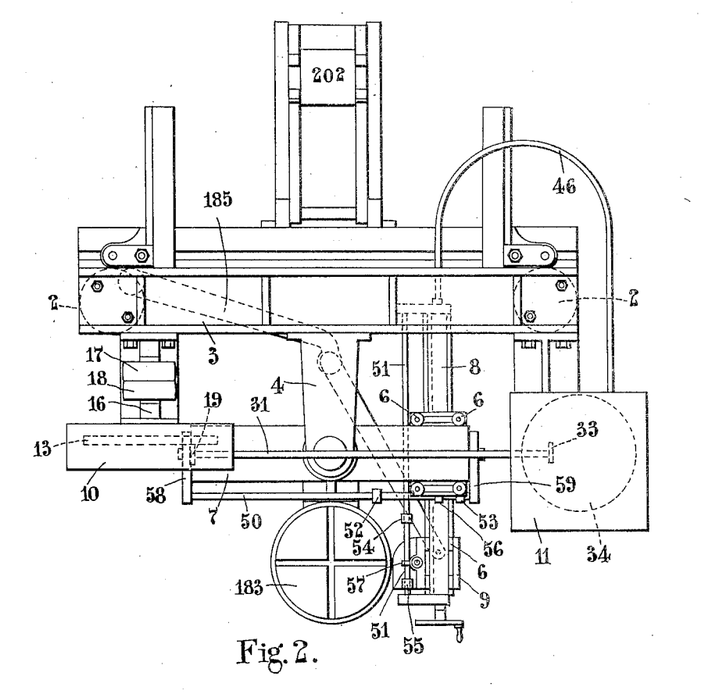
Figure 2 is a plan view of Figure 1 showing the parts in a somewhat different position.

Referring to Figures 1 and 2 of the drawings, 1 is the base of the machine and 2 indicates two pillars mounted on said base and supporting the cross member 3 from which is suspended by means of the bracket 4, the various feeds for the cutter head 5. These feeds are of substantially the same kind as those described in the specification of my United States Patent No. 1357859, but instead of the feed slide carriages sliding on plain slides, these are mounted on ball-bearing rollers 6 adapted to run on plane surfaces formed on each of the cross arms 7 and 8, while the circular feed mechanism carried on the slide carriage 9 is mounted on ball-bearings.

Figure 5:
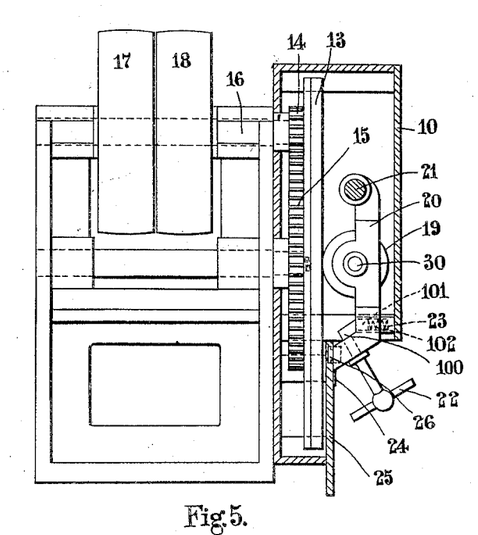
Figure 5 is a view in part sectional elevation of the first gear of the frictional driving mechanism.
Figure 6:
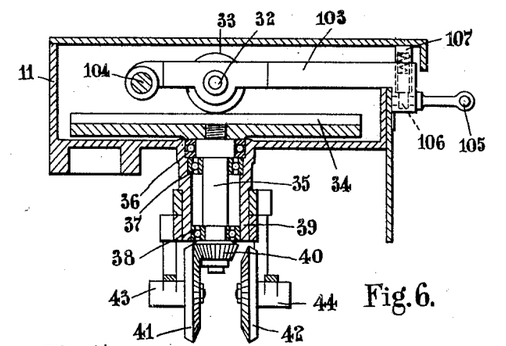
Figure 6 is a view in part sectional elevation of the second gear of the frictional driving mechanism.
Figure 7:
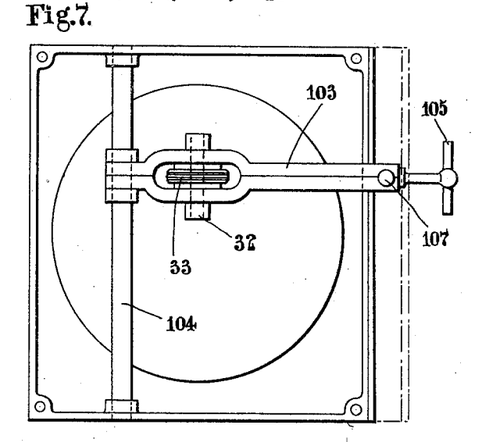
Figure 7 is a plan view of Figure 6, but with the cover removed.

On the cross member 3 are mounted two friction gear boxes 10 and 11. The gear box 10 encloses a disc 13 which is made for example of fibre, driven through gearing 14 and 15 from the counter-shaft 16 on which fast and loose pulleys 17 and 18 are mounted. These gear boxes are shown on a larger scale in Figures 5 and 6 of the drawings. The said disc 13 drives a smaller friction disc 19 which is mounted by means of ball-bearings 12 (see Figure 8) on a swing arm 20, which in its turn is mounted to slide on a horizontal arm 21 arranged parallel with the surface of the disc 13, and at a distance from the centre of the disc 13 such that the disc 19 will be movable radially with respect to the disc 13. At the lower end of the arm 20 a handle 22 is provided for raising the disc from the surface of the disc 13 when the speed ratio is to be changed, while a spring-pressed plunger 23 serves to maintain the disc 19 in contact with the disc 13, said plunger 23 having a movable abutment 101 on the other side of the spring 102, while said abutment 101 is movable by means of the cam 100 mounted at the end of the spindle of the handle 22, whereby on turning the handle 22 out of the position shown the spring pressure is relieved and the arm 20 may be withdrawn from the disc 13. A pointer 24 is provided on the arm 20 and is adapted to read against a scale marked on the plate 25 of the gear box, for the purpose of accurately adjusting the speed of the smaller disc 19. A T-groove is formed in the upper portion of the plate 25, and stops 26 are provided which are slidable in the said T-groove for the purpose of quickly and accurately setting the arm 20 at predetermined positions on the said scale.

Figure 8:
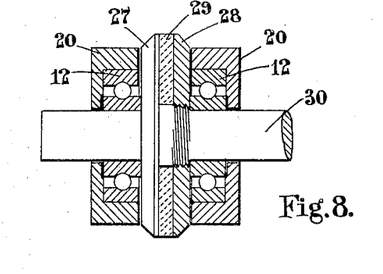
Figure 8 is a sectional detail view of one of the small friction discs and its mounting.

The friction disc 19 comprises two discs 27 and 28, see Figure 8, of the same diameter, and a leather disc 29, the said leather disc being squeezed between the discs 27 and 28 by screw pressure. With this construction the edge of the leather disc 29 forms the tractive surface, the discs 27 and 28 serving mainly as stiffening members for the leather disc 29.

At one end of the shaft 30 on which the disc 19 is mounted, the flexible shaft 31 is attached. This flexible shaft and others hereinafter referred to, are of known type wherein a spirally twisted shaft rotates inside a flexible casing. Only the casing is seen in the drawings as the construction of the shaft forms no part of this invention. The other end of the flexible shaft 31 is attached to the shaft 32 which carries the disc 33 of the gear box 11. The movement of the disc 33 with respect to the larger disc 34 is effected in the same way as in the gear box 10, and similar stop devices are provided for effecting the quick and accurate resetting of the disc 33. The disc 33 is carried in a sliding arm 103 movable along rod 104, the arm 103 having a handle 105 which operates a cam 106 for raising and lowering a spring-pressed plunger 107, serving the same purpose as plunger 23 in the first gear box. The disc 34 is rigidly fastened to the upper end of a vertical shaft 35 suitably mounted by means of thrust and journal ball-bearings 36, 37 and 38 respectively, in the sleeve 39 projecting from the lower portion of the gear box 11. At the lower end of the shaft 35 a bevel pinion 40 is mounted and is adapted to engage with either of two bevel gears 41 and 42. Those bevel gears are mounted on shafts in bearings 43 and 44 carried on the movable members of a kind of link parallellogram, the stationary members of which are rigidly mounted on the sleeve 39, while the movement of the bevel gears 41 and 42 is limited so that either one or other of them may be brought into effective engagement with the pinion 40. The outer ends of the shafts of the bevel gears 41 and 42 are connected to flexible shafts 45 and 46, the outer casings of which are connected to the bearings 43 and 44. The other ends of the flexible shafts 45 and 46 are adapted to be attached to either of the feed shafts according to the direction of feed required, or to the circular cutting feed mechanism.

Figure 1A:
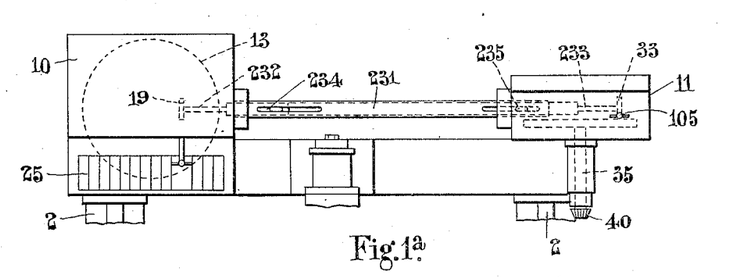

In the modification shown in Figure 1ᵃ, the flexible shaft 31 connecting the small friction discs 19 and 33 is replaced by a rigid shaft. The gear box 11 is placed at a higher level so that its disc 33 may be approximately in axial alinement with the disc 19 of gear box 10, and a hollow shaft 231 is mounted in bearings at the sides of the gear boxes. Short spindles 234, 235 slide in the ends of the shaft, and have keys as shown engaging in slots therein. The spindles are connected to the discs 19, 33 respectively by short lengths of flexible shafting 232, 233, so as to allow of the separate pressing into engagement of the discs with large friction discs 13 and 34 respectively, as already described.

Figure 9:
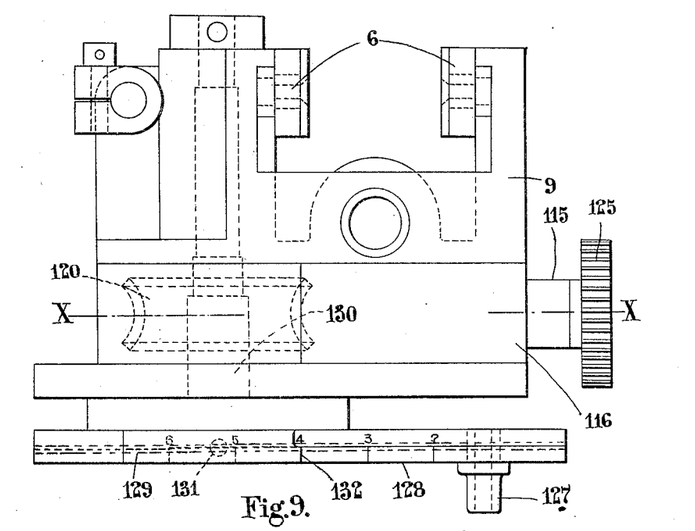
Figure 9 is a view in elevation on a larger scale of the circular cutting device and means thereon for holding the cutter head for guiding purposes.
Figure 10:
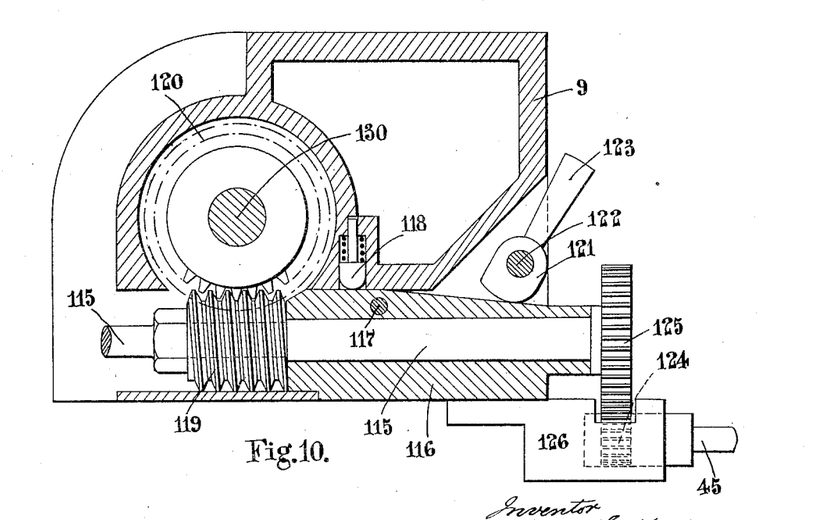
Figure 10 is a view in section of Figure 9 taken on the line X—X.

In using the machine according to the present invention it is most convenient, as shown in Figures 1 and 2, to mount the cutter head in the circular feed mechanism for all operations. Figures 9 and 10 show a construction whereby this is made possible without having to disconnect the flexible shaft from the worm wheel shaft of this feed mechanism. The said worm wheel shaft 115 is carried in a bearing 116 pivotally mounted at 117 on the slide carriage 8. In the member 8 a recess is formed in which a spring-pressed plunger 118 is situated, said plunger tending to move the inner end of the bearing 116 outwardly so as to withdraw the worm 119 from the worm wheel 120. Toward the other end of the bearing 116 a cam 121 is adapted to abut, said cam being pivotally mounted on the member 9 at 122 and operated by means of the handle 123 formed integral therewith. In the position shown in the drawings, the worm 119 is in mesh with the worm wheel 120. When it is required to disengage them the lever 123 is pressed towards the bearing 115, thus moving the cam 121 away from the bearing and allowing the plunger 118 to move the worm 119 out of engagement with the worm wheel 120. The shaft 115 is driven from the flexible shaft 45 through the gears 124 and 125, the gear 124 being mounted on a shaft carried in a bracket 126 rigidly mounted on the carriage 9. With this arrangement, when the bearing 115 is pivoted around 117 the pinion 125 will come into or out of engagement with the pinion 124.

The cutter engages with the carriage 9 by means of a pin at the upper end of the stem 47 coaxial with the burner nozzle 5 (Figure 1), said pin engaging inside a hollow socket 127 mounted on a radial scale arm 128 which is slidably mounted in a groove in the member 129 rigidly attached to the spindle 130. A V-groove is formed in the arm 128 and a set screw 131 engaging in said groove is adapted to clamp the arm 128 in position. A marking off face is provided on the member 129 at 132 and the scale on the arm 128 is calibrated so that the readings opposite 132 correspond with the distances of the centre line of the cutter head from the axis of the spindle 130. With this arrangement, to cut a circle of a required radius the arm 128 is slid until the required reading is opposite 132 and the arm is clamped in position by means of the set screw 131; the worm 119 is then made to engage with the worm wheel 120 and the feeding commences. A hand wheel 48 (Figure 1) may be mounted on the end of the spindle 115 in order to allow of turning the circular cutting device by hand when required.

In order to effect the automatic stopping of the burner nozzle feed, slidable stop rods 50 and 51 are provided on each of the transverse arms 7 and 8. Stops 52, 53, 54 and 55 are slidably mounted on this stop rod, but provided with means for clamping them in any desired position on said rods. Bosses 56 and 57 are provided on each of the sliding carriages, a hole being formed in each of said bosses, through which holes the stop rods 50 and 51 are passed. At one end of each stop rod means are provided whereby on the axial movement of the stop rod engagement or disengagement occurs between the flexible shaft and the feed shaft.

Figure 11:
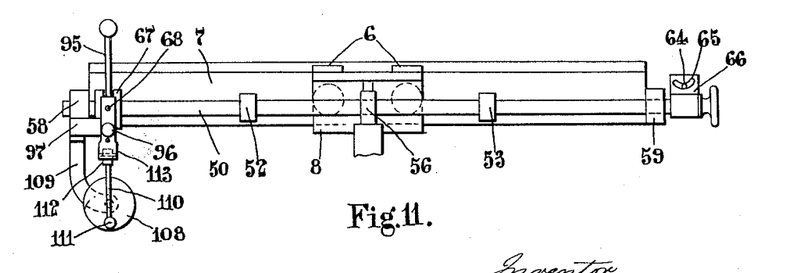
Figure 11 is a view in elevation on a larger scale and more in detail showing the feed stop mechanism.
Figure 12:
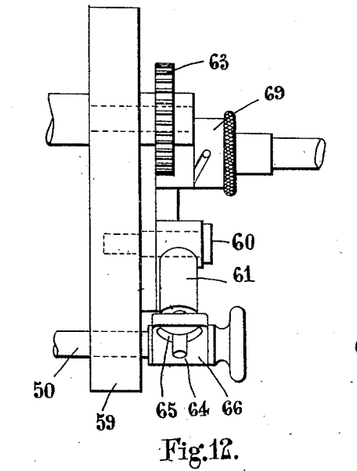
Figure 12 is a plan view on an enlarged scale showing the mechanism for effecting the engagement and disengagement between the flexible shaft drive and the feed mechanism.
Figures 13, 14:
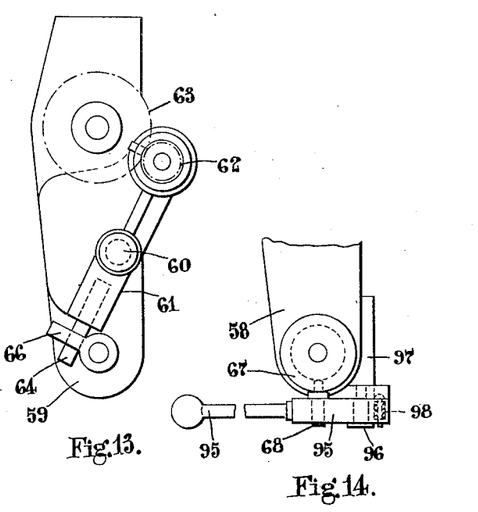
Figure 13 is a side view of Figure 12.
Figure 14 is an end view of the hand operated mechanism for effecting the engagement or disengagement between the flexible shaft drive and the feed mechanism.

Figure 11 shows a general arrangement of the above stopping mechanism, together with means for effecting engagement and disengagement between the flexible shaft and the feed shaft. The stop rod 50 is supported from the member 7 by means of two arms 58 and 59. On the arm 59 a pin 60 is provided, see Figures 12 and 13, and on this pin is pivotally mounted an arm 61 at one end of which is mounted a pinion 62 adapted to engage with a pinion 63 which is rigidly mounted on the feed shaft. A bayonet socket joint 69 is provided at this end of the arm 61 for connection to one of the feed shafts. At the other end of the arm 61 a pin 64 is provided and is adapted to engage in a cam groove 65 formed in a fibre cam member 66 which is rigidly mounted on the stop rod 50. At the other end of the stop rod 50 a fibre collar 67 is mounted. This collar has a groove formed therein for engagement with a pin 68 (Figure 14), mounted on a lever 95 which is pivotally mounted by means of a pin 96 on a bracket 97 rigidly attached to the arm 58. By rocking the arm 95 in either direction the cam 65 causes the arm 61 to rock, and thus engagement or disengagement between the pinions 62 and 63 is effected. It will be seen that engagement occurs when the pin 64 is at the middle portion of the cam groove 65. In order to insure the pin 64 remaining at the mid-position a spring-pressed plunger 98 is provided at the lower end of lever 95 to engage with the corresponding recess in the member 97.

The operation of the stopping mechanism is as follows:—The stops 52 and 53 are set along the rod 50 according to the amount of feed required. The lever 62 is moved so that the pin 64 is in the mid-position in the cam groove 65, whereupon the flexible shaft drive is transmitted to the feed shaft, and continues to feed until the boss 56 abuts against either of the stops 52 and 53, depending upon the direction in which the feed is made. When this occurs the stop rod 50 is moved axially so that the cam groove 65 forces the pin 64 to move upwardly. This rocks the lever so that the pinion 62 comes out of engagement with the pinion 63 of the feed shaft, and feeding is stopped automatically. For effecting a feed along the member 8, the feed mechanism is exactly the same as that just described for feeding on the member 7.

Figure 11 also shows a mechanical alarm device whereby an indication is given to the operator when the end of a cut is reached, and when the gear 62, 63, is disengaged by the stop 52 or 53 striking against the boss 56, assuming that a cut is being made by traversing the carriage 8 along the member 7. A similar device may be provided to be operated by the stops 54, 55, and boss 57 on the other transverse member 8. A cam face at 113 on the lower end of lever 95 engages with a cam on a block 112 pivotally supported just below the end of lever 95. This block 112 carries a spring tongue 110 on which is a knob 111 adapted to strike against a bell 108. The bell 108 is mounted on a bracket 109 rigidly attached to the transverse member 7. When the lever 95 is in its mid-position the tongue 110 is lifted, but when the lever 95 is thrown over by one of the stops toward either side from the position shown in Figure 11, the tongue 110 is liberated, and its knob 111 vibrates against the bell 108, causing the same to ring. An automatic electric alarm device hereinafter described, is preferred however in practice, as it gives an indication the moment that a stop 52, 53, 54 or 55 comes against its boss 56 or 57, and gives a continuous ringing sound until its circuit is broken.

Figure 15:
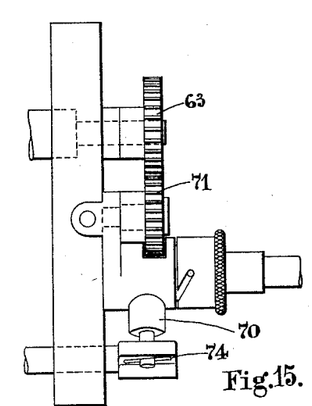
Figures 15 and 16 are similar views to Figures 9 and 10 of an alternative form of engaging and disengaging mechanism between the flexible shaft drive and the feed mechanism.
Figure 16:
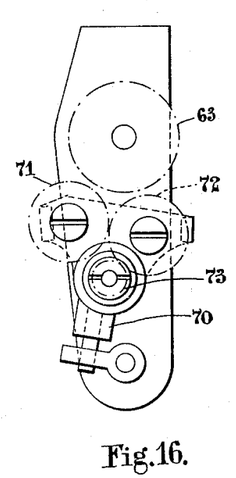
Figure 17:
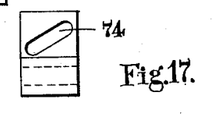
Figure 17 is a true form view of the cam shown in Figure 15.

Figures 15 to 17 show a modification of the feed stopping means whereby reversal of the feed can be effected. This modification consists in substituting a lever 70 for the lever 61 above referred to, and mounting thereon two intermeshing pinions 71 and 72, one of which, 72, also meshes with the pinion 73 which is driven by means of the flexible shaft. By rocking the arm 70 either pinion 71 or 72 may be made to engage with the pinion 63 of the feed shaft, according to the direction in which the arm 70 is rocked. As with one of the engagements an extra pinion is introduced, the feed with the one engagement is in a reverse direction to that with the other engagement. In this case the stop rod 50 is provided with a member with an inclined groove therein as at 74 in Figures 15 and 17 through which the arm 70 is passed. In this construction the mid-position, that shown in Figure 15, is in the position of disengagement, or the neutral position, whilst when the stop rod is moved to the right the wheels 71 and 63 are brought into gear and when moved to the left the wheels 72 and 63 are brought into gear.

In order to insure absolute uniformity of speed of cutting with the friction drive arrangement above described, it is essential that the various feeds should be as nearly frictionless as possible. For this reason the feed carriages are shown mounted on ball-bearing rollers which are made to run on smooth tracks formed on arms 7 and 8. For the same reason the friction driving discs, the friction discs running thereon, and the parts driven by the flexible shafts are also mounted on ball-bearings.

A diagram of the electric bell circuits which it is preferred to use for giving an alarm when the end of a cut is reached, is shown in Figure 1. In these circuits the bell terminals 80 and 81 are each connected direct by means of the wires 82 and 83 to the terminals 84 and 85 which are mounted in fibre blocks 86 and 87, which in their turn are mounted on a suitable bracket in close proximity to the bevel gearing. A pin 88 adapted to make contact with either of the terminals 84 and 85 is provided on the link mechanism which effects the movement into or out of engagement of the bevel gears 41 and 42 with the pinion 40, so that only one of the two circuits is earthed by pin 88 while feeding of the burner nozzle is being effected. The other terminals 89 and 90 of the electric bells are connected through batteries 91 and 92, to the stop rods 50 and 51 respectively by means of the wires 93 and 94, the said stop rods being mounted in their respective supports by means of insulating bushes, while the bosses 56 and 57 through which the stop rods are passed are also provided internally with insulating bushes. In operation the pin 88 is brought into contact with one or other of the terminals 84 and 85 (in the arrangement shown terminal 85) according to the stop rod in use at the time (in the present case rod 50), and the corresponding circuit viz 83, 92, 93 is closed when the face of a stop such as 52 or 53 contacts with the face of the boss 56 for example. When the pin 88 is brought into contact with terminal 86 then the circuit 82, 91, 93 comes into operation.

Figure 18:
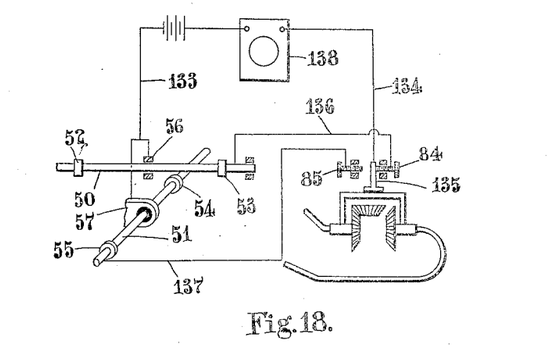
Figure 18 is a diagrammatic sketch showing an alternative electric alarm circuit.

Figure 18 shows diagrammatically an alternative alarm circuit in which a single bell only is used. In this case one load 133 of the bell circuit is connected directly or through the frame of the machine to the bosses 56, 57, while the other load 134 is connected to an insulated pin 135 which is substituted for the pin 88 in the arrangement above set forth. The terminals 84 and 85 are then connected to the insulated stop rods 50 and 51 respectively by means of the leads 136 and 137. With this arrangement, when contact is made between the boss 56 and one of the stops 52 and 53, the bell 138 will ring, but on throwing over the pin 135 to contact with the terminal 85 the lead 136 is cut out of circuit, and the bell stops ringing, while the lead 137 connected to the stop rod 51, is cut in ready for co-operation with the other slide carriage.

The cutter head 5 has a nozzle 171 and a valve mechanism controlling the feed of the oxygen and acetylene or other gas thereto. This mechanism is indicated only diagrammatically at 49 as its construction forms no part of the invention, while 114 represents the flexible piping by which the gases are supplied. The cutter head is carried, in the example shown, on a swing frame 185 supported on one of the pillars 2, and operating in the manner described in United States Patent Specification No. 1357859.

The cutter head is shown as operating upon a work-piece in the form of a plate 200 held in clamps at 201, and supported if required at its rear end, as in the case of a long plate by a roller 202. These details are not described further here as they form no part of the present invention. Smaller work-pieces may be clamped on a table 183 which may be fixed or revoluble according to requirements.

Figure 3:
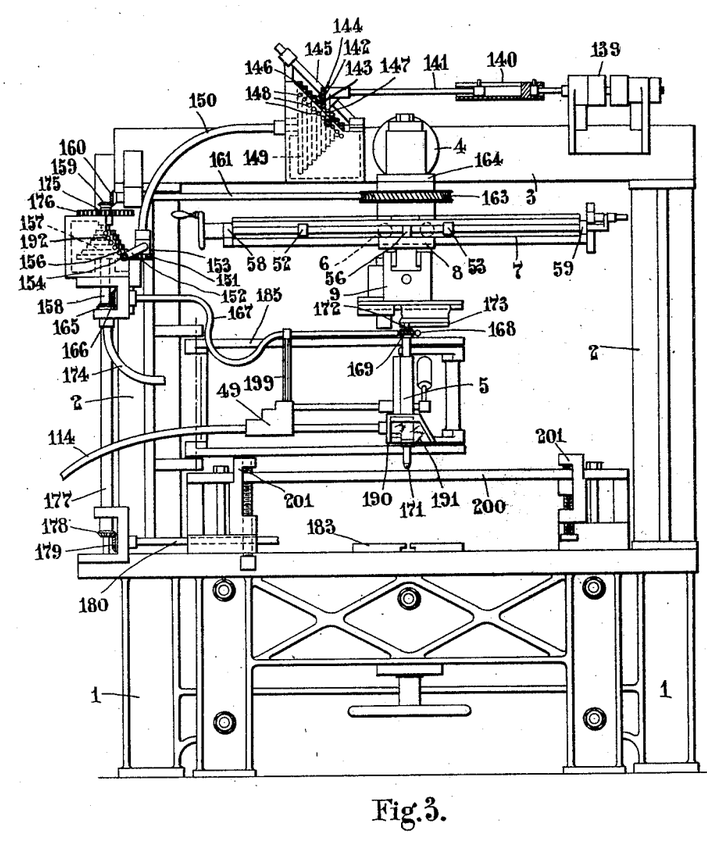
Figure 3 is a view in elevation of another form of construction of a machine according to the present invention, and shows the use of toothed gearing driving mechanism.
Figure 4:
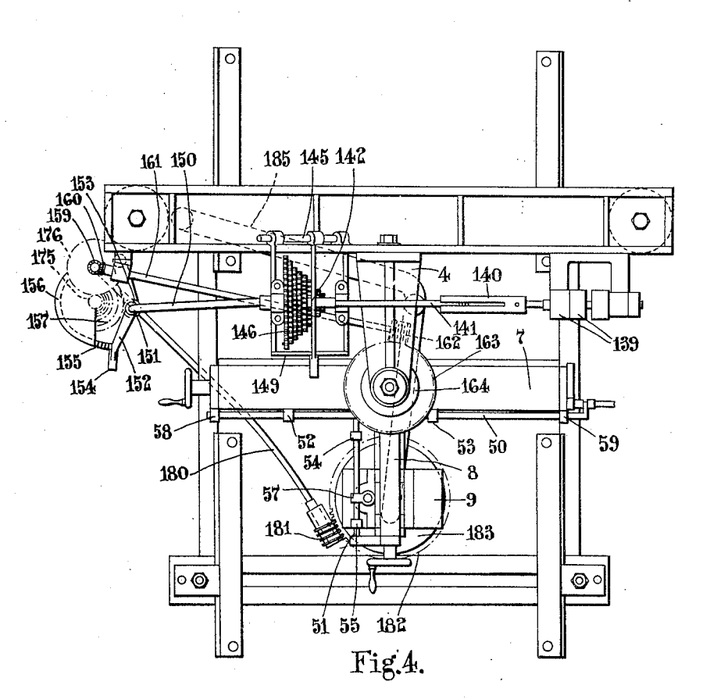
Figure 4 is a plan view of Figure 3.

Figures 3 and 4 show a further example of construction of a cutting machine according to the present invention. In this construction the feeding is also effected by means of flexible shafting, and the construction and arrangement of the cross slides, swing frame for supporting the cutter head, and so forth, are the same as those shown in Figures 1 and 2, but the speed of the cutting feed is varied by means of two sets of toothed gears. In the drawing, 139 indicates a clutch mechanism whose shaft is connected by a sliding coupling 140 to a flexible shaft 141. The shaft 141 is connected to one of a pair of meshing pinions 142 and 143 which are mounted on an arm 144 which at one end is slidabaly and rotatably mounted on a rod 145, so that it may have its pinion 143 brought into engagement with the desired portion of the gear cone 146. At the other end the arm 144 is provided with a downwardly bent portion 147. A projection is provided on the swing portion 147 and is adapted to engage with holes formed at 148 on the gear casing 149, these holes corresponding with the different sized gear wheels on the cone.

From the cone 146 the flexible shaft 150 is led to the pinion 151 which is carried in bearings on an arm 152 mounted on the main structure of the machine to swing about a vertical shaft 153. At the other end of the arm 152 a handle 154 is provided, the base of which has a suitably shaped face adapted to engage on steps 155 formed on the curved member 156, while the handle 154 also has a pin which can be engaged in any one of a set of holes 192 in the member 156 beside the steps 155. Each of said steps 155 and holes 192 corresponds to one of the gear wheels of the cone 157, and is so formed that when the part 154 is resting on any one of said steps the pinion 151 will be in engagement with the corresponding gear wheel on the cone 157. Alternatively, a similar arrangement may be used for this second set of gears as is shown for the first set of gears. In one gear set the holes 148, or 192 are marked to correspond with the size of circle to be cut, while in the other gear set they are marked to correspond with the thickness of the metal to be cut. Instead of toothed gear cones 146, 157, and the toothed wheels engaging therewith, friction wheels could be used, the gear cones then taking the form of stepped friction cones, or, if preferred, plain friction cones.

Figure 19:
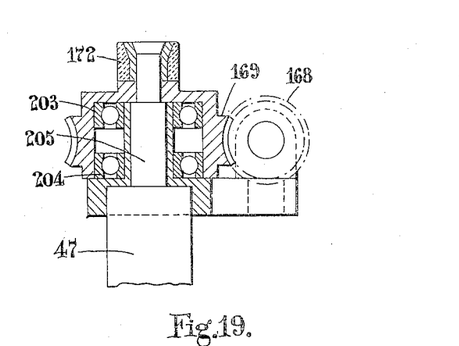
Figure 19 is a sectional elevation of the friction roller and its driving gear at the upper end of the cutter head, used when the cutter head is fed directly around a template.
Figure 20:
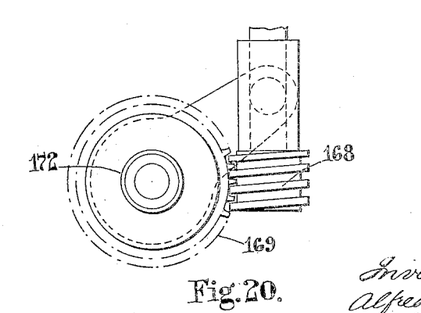
Figure 20 is a plan view of Figure 19.

The cone 157 is rigidly mounted on a vertical shaft 158, and at the upper end of the shaft 158 a pinion 175 is rigidly mounted. The said pinion 175 meshes with a toothed wheel 176 rigidly mounted at the upper end of the vertical shaft 177, which also has a bevel pinion 159 mounted thereon, said pinion being in mesh with a bevel pinion 160 rigidly mounted on the end of a shaft 161. The other end of shaft 161 has a worm 162 which meshes with the worm wheel 163 rigidly mounted on a revoluble head 164 from which the compound slide is suspended. At the lower end of the shaft 158 a bevel pinion 165 is mounted, and this pinion meshes with a further bevel pinion 166 whose drive is transmitted by means of the flexible shaft 167 to a worm 168. The flexible shaft 167 may be supported at a suitable point on a bracket 199 from the controlling mechanism 49 of the cutter head, so that said shaft will always be kept clear of the mechanism 49. The worm 168 is in mesh with a worm wheel 169 mounted by means of ball-bearings 203 and 204 on a vertical shaft 205 (see Figures 19 and 20) on the pin 47 which projects upwardly from the cutter head 5 and in axial alignment with the burner nozzle 171. A small roller 172 is provided at the upper end of this shaft which is reduced in diameter in order that a relatively small roller may be used and is adapted to roll against the template 173 mounted on the compound slide. The lower end of the shaft 158 is also connected, but this time without the intermediary of gear pinions, to the flexible shaft 174, the other end of which is adapted to be adjustably connected to either of the feed shafts of the cross slides.

At the lower end of the shaft 177 a bevel pinion 178 is mounted, and this pinion engages with a further bevel pinion 179 whose drive is transmitted by means of the flexible shaft 180 to a worm 181 which meshes with a worm wheel 182 rigidly fastened to the revoluble work-table 183.

It will be seen that all the feed movements in this machine are capable of being operated mechanically. Further, when cutting out circles the work-piece may be held on the table 183 (Figure 4) by means of an electro-magnetic chuck for example, said table then being revolved by means of the flexible shaft 180, while the burner nozzle 171 is held stationary.

Figure 21:
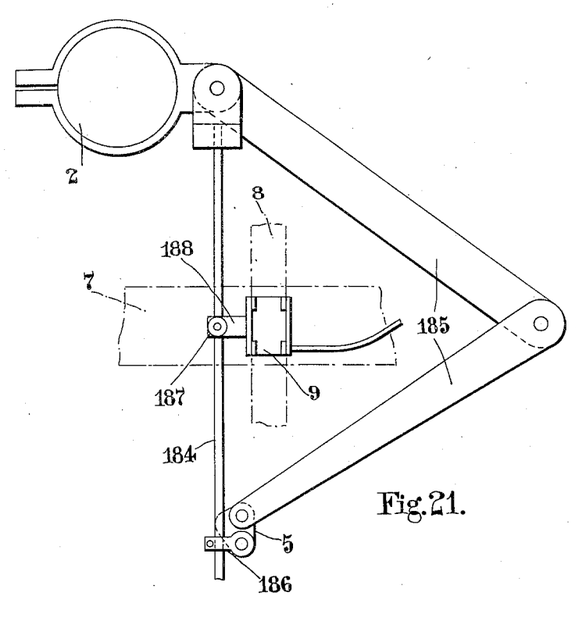
Figure 21 is a semi-diagrammatic plan view of the segment cutting device.
Figure 22:
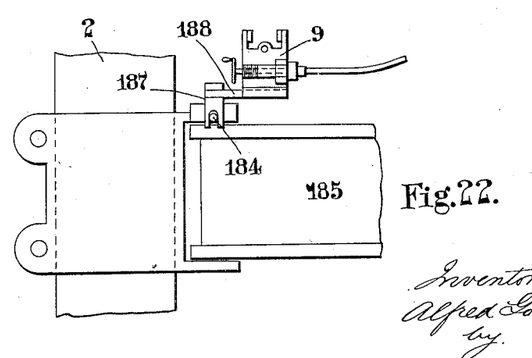
Figure 22 is a view in elevation of part of Figure 21.

Figures 21 and 22 show a device for cutting out large segments of circles wherein a swing arm 184 is mounted on the column 2 carrying the swing frame 185, said swinging arm having a sliding connection 186 mounted thereon which is adapted to engage with the cutter head 5 mounted on the swing frame 185. Feeding is effected by connecting the swinging arm 184 to the slide carriage 9 by means of the forked member 187 carried by an arm 188 which is substituted for the adjustable arm 128 (Figure 9) generally carried on the lower slide carriage for engagement with the cutter head. The upper transverse member 7 is swung around approximately at right-angles to the arm 184, and the lower transverse member 8 with the slide carriage 9 is fed along the member 7 until the required length of segment is cut. In Figure 21 the transverse members are shown diagrammatically in dotted lines for the sake of simplicity, while in Figure 22 they are omitted altogether. With this arrangement the segments can be cut up to a radius of nearly the same length as the full extent of the swing frame. The swinging arm 184 preferably has a scale engraved thereon so as to facilitate correct setting for any particular radius.

Figure 23:
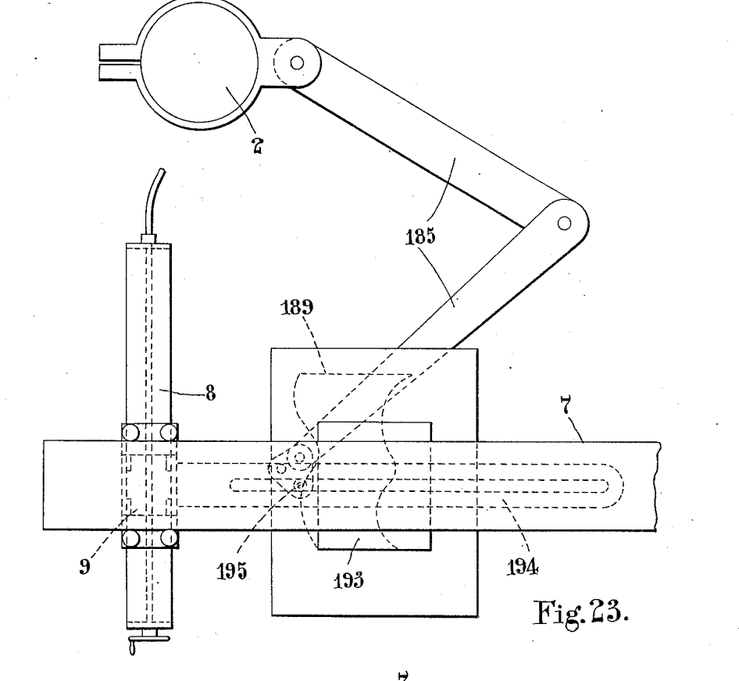
Figure 23 is a semi-diagrammatic plan view of an alternative device for feeding the cutter head around a template.
Figure 24:
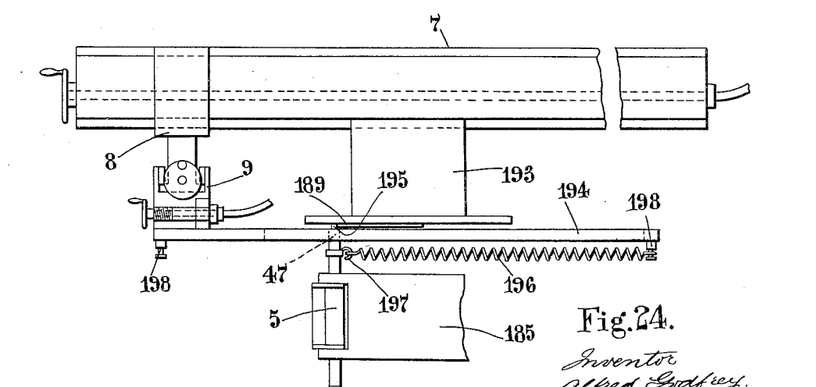
Figure 24 is a view in elevation of Figure 23.

Figures 23 and 24 show an arrangement having for its object the application of the automatic feed to the control of the cutter head by means of a template. The template 189 is mounted on the upper transverse member 7 by means of a distance member 193 in order to bring it to the level of the pin 195 at the upper end of the stem 47 of the cutter head 5. The slide carriage 9 has a slotted arm 194 rigidly fastened thereto and projecting at right angles to the lower transverse arm 8, the stem 47 engaging in the slot of the arm 194, while its pin 195 is pressed up against the template 189 by means of a spring 196. One end of the spring 196 is held by a hook 197 revolubly mounted on the cutter head 5, while the other end is adapted to be held by either of the pins 198 mounted at either end of the slotted arm 194 according to the side of the template against which the pin 195 is to be pressed. Feeding is effected by moving the slide carriage 9 along the member 8, which must be swung round to a position parallel with the general direction of the template outline, in order that the speed of movement of the cutter head along the line of the template may be as uniform as possible, in spite of the straight line movement of the arm 194.

It is usual for the operator to wear coloured glasses to prevent injuries to the eyes from the glare of the oxy-acetylene flame. These glasses interfere with the operator when adjusting the machine. To overcome this difficulty, a screen 190 is mounted on the frame of the blow-pipe or cutter head 5 holding suitably coloured glasses 191 which will shield the man's eyes from the glare of the flame in a more effective manner than is the case with the usual glasses.

The telescopic connection 140, 141, shown in Figure 3 may be substituted, if desired, for the flexible shaft 31 (Figures 1 and 2), while rigid shaft-lengths are used, universal joints being provided at the ends of the shafts so as to allow of variation of the angle between said shafts and the respective feed shafts to which they are connected.

Having thus described my invention what I claim as new and desire to secure by Letters Patent is:—

1. A gas cutting machine comprising a cutter head having a burner nozzle, a support above said cutter head adapted to co-operate therewith, means for guiding the cutter head and the work relatively to one another, a power source, variable speed gearing in driving relation with said power source, and flexible transmission means between said variable speed gearing and the said guiding means.

2. A gas cutting machine comprising a cutter head having a burner nozzle, a support above said cutter head adapted to co-operate therewith, means for guiding the cutter head and the work relatively to one another, a power source, variable speed gearing in driving relation with said power source, and flexible shafting between said variable speed gearing and the said guiding means.

3. A gas cutting machine comprising a cutter head having a burner nozzle, a support above said cutter head adapted to co-operate therewith, means for guiding the cutter head and the work relatively to one another, a power source, variable speed gearing in driving relation with said power source, flexible transmission means between said variable speed gearing and the said guiding means, adjustable stops on said guiding means, and mechanism co-operating with said stops, said mechanism being adapted to disconnect the flexible transmission means from the said guiding means when the cutter head reaches the end of its travel.

4. A gas cutting machine comprising a cutter head having a burner nozzle a support above said cutter head adapted to co-operate therewith, means for guiding the cutter head and the work relatively to one another, a power source, variable speed gearing in driving relation with said power source, said variable speed gearing comprising a plurality of change speed gear units interconnected by means of flexible connections, and flexible transmission means between said variable speed gearing and the said guiding means.

5. A gas cutting machine comprising a cutter head having a burner nozzle a support above said cutter head adapted to co-operate therewith, means for guiding the cutter head and the work relatively to one another, a power source, two variable speed gearing units in consecutive driving relation with said power source, each unit comprising a large disc, and a second relatively smaller disc adapted normally to make driving contact with the surface of the large disc and to be adjustable radially relatively thereto, a flexible connection between said power source and the large disc of one of the said change speed gearing units, flexible transmission means between the small discs of the two units, and flexible transmission means between the large disc of the other of the said change speed gearing units and the said guiding means.

6. A gas cutting machine comprising a cutter head having a burner nozzle, a support above said cutter head adapted to co-operate therewith, means for guiding the cutter head and the work relatively to one another, a power source, variable speed gearing in driving relation with said power source, said variable speed gearing comprising a plurality of change speed gear units interconnected by means of flexible connections, a pinion in driving relation with the last of said gear units, a support, a swing frame on said support, two substantially oppositely disposed crown wheels revolubly mounted on said swing frame and adapted to engage singly with said pinion, and flexible transmission means between each of said crown wheels adapted to be detachably connected to the various guiding means.

7. A gas cutting machine comprising a cutter head having a burner nozzle, a support above said cutter head, a compound slide member carried by said support adapted to co-operate with said cutter head, said compound slide member including transverse members and slide carriages with feed shafts therefor, means for guiding the cutter head and the work relatively to one another, a power source, variable speed gearing in driving relation with said power source, flexible transmission means between said variable speed gearing and the feed shafts of the compound slide member, a plurality of longitudinally movable stop rods mounted one on each transverse member of said compound slide, adjustably mounted stops on said stop rods, and means adapted to be actuated by said stop rods for disconnecting the flexible transmission means from the feed shafts of the compound slide when the slide carriages reach the end of their movement.

8. A gas cutting machine comprising a cutter head having a burner nozzle, a support above said cutter head adapted to co-operate therewith, means for guiding the cutter head and the work relatively to one another, a power source, variable speed gearing in driving relation with said power source, flexible transmission means between said variable speed gearing and the said guiding means, adjustable stops on said guiding means, mechanism co-operating with said stops, said mechanism being adapted to disconnect the flexible transmission means from the said guiding means, and an alarm device adapted to operate in conjunction with said stop devices so as to indicate when the end of a feed is reached.

9. A gas cutting machine comprising a cutter head having a burner nozzle, a support above said cutter head, means for guiding the cutter head and the work relatively to one another, said means including a compound slide member carried by said support and adapted to co-operate with said cutter head, a circular cutting feed mechanism mounted on the lower slide of said compound slide, said circular feed mechanism comprising a spindle rotatably mounted on said slide carriage, a radially projecting arm adjustably mounted in said spindle with means on said arm for holding the cutter head, a worm wheel on said spindle, a worm adapted to engage with said worm wheel, said worm being rigidly mounted on a spindle held in a bearing pivotally mounted on the slide carriage, whereby the said worm and worm wheel may be brought into and out of engagement, a power source, variable speed gearing in driving relation with said power source, and flexible transmission means between said variable speed gearing and the said guiding means.

ALFRED GODFREY.